(12) United States Patent
Buck et al.

(10) Patent No.: US 10,929,492 B2
(45) Date of Patent: *Feb. 23, 2021

(54) UTILIZING ATTRIBUTES OF USERS TO CLUSTER USERS AT A WAYPOINT

(71) Applicant: International Business Machines Corporation, Armonk, NY (US)

(72) Inventors: Alexander J. Buck, Austin, TX (US); Alyson T. Cabral, Austin, TX (US); Karl J. Weinmeister, Austin, TX (US); Brian L. White Eagle, Austin, TX (US); James Xenidis, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 16/013,611

(22) Filed: Jun. 20, 2018

(65) Prior Publication Data

US 2018/0300344 A1 Oct. 18, 2018

Related U.S. Application Data

(63) Continuation of application No. 14/669,184, filed on Mar. 26, 2015, now Pat. No. 10,102,296.

(51) Int. Cl.
*G06F 16/90* (2019.01)
*G06F 16/9537* (2019.01)

(52) U.S. Cl.
CPC ................ *G06F 16/9537* (2019.01)

(58) Field of Classification Search
None
See application file for complete search history.

(56) References Cited

U.S. PATENT DOCUMENTS

| 7,847,684 B1 | 12/2010 | Brady, Jr. |
| 8,316,020 B1 | 11/2012 | Kleinmann |
| 8,386,620 B2 | 2/2013 | Chatterjee |

(Continued)

OTHER PUBLICATIONS

Heer et al., "Separating the Swarm: Categorization Methods for User Sessions on the Web," CHI 2002, Apr. 20-25, 2002, Minneapolis, Minnesota, vol. No. 4, Issue No. 1, pp. 243-250.

(Continued)

*Primary Examiner* — Belix M Ortiz Ditren
(74) *Attorney, Agent, or Firm* — Robert A. Voigt, Jr.; Winstead PC

(57) ABSTRACT

A method, system and computer program product for assisting a user to meet with other users with complementary attributes. Attributes (e.g., likes, dislikes) of a user, such as a user of a mobile device, are received to populate a profile of the user. The user attributes of profiles of actively participating users that are located in a geographic area are analyzed with respect to the attributes of the user to identify other users with complementary profiles. Those users with complementary profiles as the user are clustered to form a "cluster" at a designated waypoint. Directions are then provided to the user to reach the designated waypoint to meet the other users of the same cluster. In this manner, the user is able to meet other users in the physical world with complementary interests and experiences at a designated waypoint.

20 Claims, 12 Drawing Sheets

(56) References Cited

U.S. PATENT DOCUMENTS

| | | |
|---|---|---|
| 8,392,416 B2 | 3/2013 | Duffield et al. |
| 8,782,560 B2 | 7/2014 | Purdy et al. |
| 9,299,060 B2 * | 3/2016 | Panzer .................. G06Q 10/10 |
| 2007/0168332 A1 | 7/2007 | Bussard et al. |
| 2009/0248607 A1 | 10/2009 | Eggink et al. |
| 2010/0198828 A1 | 8/2010 | Petersen et al. |
| 2011/0106736 A1 | 5/2011 | Aharonson et al. |
| 2014/0218193 A1 | 8/2014 | Huston |

OTHER PUBLICATIONS

List of IBM Patents or Patent Applications Treated as Related, Jun. 21, 2018, pp. 1-2.

* cited by examiner

UTILIZING ATTRIBUTES OF USERS TO CLUSTER USERS AT A WAYPOINT

TECHNICAL FIELD

The present invention relates generally to social networking, and more particularly to utilizing the attributes of users to cluster users at a waypoint.

BACKGROUND

A social network service is an online service, platform or site that focuses on building social networks or social relations among people (e.g., those with complementary interests and/or activities). A social network service essentially consists of a representation of each user (often a profile), his/her social links, and a variety of additional services. Most social network services are web-based and provide means for users to interact over the Internet, such as by e-mail and instant messaging. Social networking sites allow users to share ideas, activities, events, and interests within their individual networks.

Currently though such social networking sites only provide users the ability to interact with other users "virtually" as opposed to "physically." However, people are generally social and desire to interact with other people with common interests and experiences in the "physical world" as opposed to simply the "virtual world." If a user desires to meet another user in person, then the user may typically send a message to the other user requesting to meet at a designated place at a designated time. However, such a process is inefficient and requires the user to personally invite every individual the user may have an interest in meeting. Furthermore, there may be other individuals with complementary interests and experiences that the user does not know and it would be nice for the user to meet with those individuals. "Complementary" interests and experiences, as used herein, refer to interests and experiences that match or harmonize with each other. For example, it may be shown that people who like jazz music get along very well with dog lovers. As a result, such interests may be said to be complementary. Currently though social networking services do not assist the user in meeting such individuals with complementary interests and experiences in the physical world.

SUMMARY

In one embodiment of the present invention, a method for assisting a user to meet with other users with complementary attributes comprises receiving attributes of a user to populate a profile of the user. The method further comprises analyzing user attributes of profiles of actively participating users that are located in a geographic area with respect to the attributes of the user to determine other users with profiles complementary with the user's profile. The method additionally comprises clustering the user and the other users with profiles complementary with the user's profile to form a cluster at a designated waypoint. Furthermore, the method comprises assigning the user and the other users to the cluster. Additionally, the method comprises monitoring a duration of time the user participates in meeting with the other users of the cluster at the designated waypoint. In addition, the method comprises determining a success of assigning the user to the cluster based on the duration of time the user participates in meeting with the other users of the cluster at the designated waypoint. The method further comprises assigning a weight to an algorithm for assigning the user to the cluster based on the success of assigning the user to the cluster.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for assisting a user to meet with other users with complementary attributes. In one embodiment of the present invention, attributes of a user, such as a user of a mobile device, are received to populate a profile of the user. Such attributes may indicate the user's interests and experiences, such as the user's likes, dislikes, birthplace, marital status, residence, age, profession, associations (e.g., friends, organizations), schooling, past location data, etc. The attributes stored in profiles of actively participating users that are located in a geographic area where the user is located are analyzed with respect to the attributes of the user to identify other users with complementary profiles. "Complementary profiles," as used herein, refer to profiles containing attributes that are deemed to be complementary. That is, complementary profiles contain attributes that match or harmonize with each other. Those users with complementary profiles as the user are clustered to form a "cluster." A "cluster," as used herein, refers to a group of users (users of mobile devices) that are determined to have complementary profiles and are directed to all meet at a designated waypoint. These users are then assigned to the cluster. Directions are then provided to the user to reach the designated waypoint to meet the other users of the same cluster. In this manner, the user is able to meet other users in the physical world with complementary interests and experiences at a designated waypoint.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
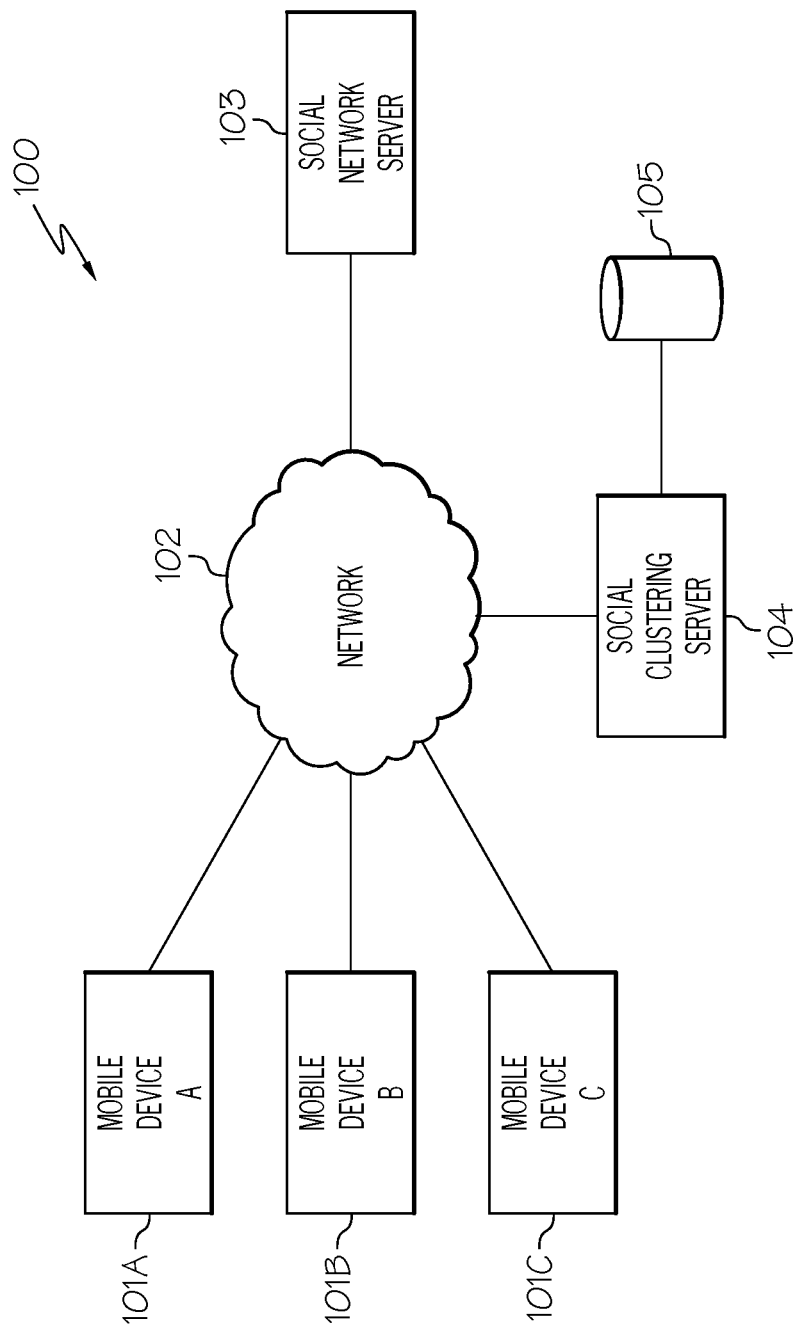
FIG. 1 illustrates a network system configured in accordance with an embodiment of the present invention.

Referring now to the Figures in detail, FIG. 1 illustrates a network system 100 configured in accordance with an embodiment of the present invention. Referring to FIG. 1, network system 100 includes a community of users using mobile devices 101A-101C (identified as "Mobile Device A," "Mobile Device B," and "Mobile Device C," respectively, in FIG. 1) to be involved in network system 100. Mobile devices 101A-101C may collectively or individually be referred to as mobile devices 101 or mobile device 101, respectively. Mobile device 101 may be a portable computing unit, a Personal Digital Assistant (PDA), a smartphone, a laptop computer, a mobile phone, a navigation device, a game console and the like. A description of the hardware configuration of mobile device 101 is provided below in connection with FIG. 2.

Mobile devices 101 may participate in a network, such as a social network, by communicating over a network 102, which may be, for example, a wireless wide area network, a circuit-switched telephone network, a Global System for Mobile Communications (GSM) network, a Bluetooth network, a Wi-Fi network, an IEEE 802.11 standards network, various combinations thereof, etc. Other networks, whose descriptions are omitted here for brevity, may also be used in conjunction with system 100 of FIG. 1 without departing from the scope of the present invention.

Furthermore, system 100 optionally includes a social network server 103, which may be a web server configured to offer a social networking and/or microblogging service, enabling users of mobile devices 101 to send and read other users' posts. "Posts," as used herein, include any one or more of the following: text (e.g., messages, comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a device referred to herein as the "social clustering server" 104 configured to assist users of mobile devices 101 to meet with other users (e.g., other users of mobile devices 101) with complementary profiles to form a "cluster" at a designated waypoint as discussed further below. "Complementary profiles," as used herein, refer to user profiles, which may be stored in database 105 connected to social clustering server 104, containing user attributes (e.g., likes, dislikes, friends, organizations) that are deemed to be complementary. That is, complementary profiles contain user attributes that match or harmonize with each other. The determination of profiles being complementary may be determined in many manners, such as being based on similar interests or experiences, a user joining a cluster, the user's application usage characteristics or historical locations of the user. A "cluster," as used herein, refers to a group of users (e.g., users of mobile devices 101) that are determined to have complementary profiles and are directed to all meet at a designated waypoint. A description of the hardware configuration of social clustering server 104 is provided below in connection with FIG. 3.

System 100 is not to be limited in scope to any one particular network architecture. System 100 may include any number of mobile devices 101, networks 102, social network servers 103, social clustering servers 104 and databases 105. Furthermore, in one embodiment, social clustering server 104 may be part of mobile device 101.

Figure 2:
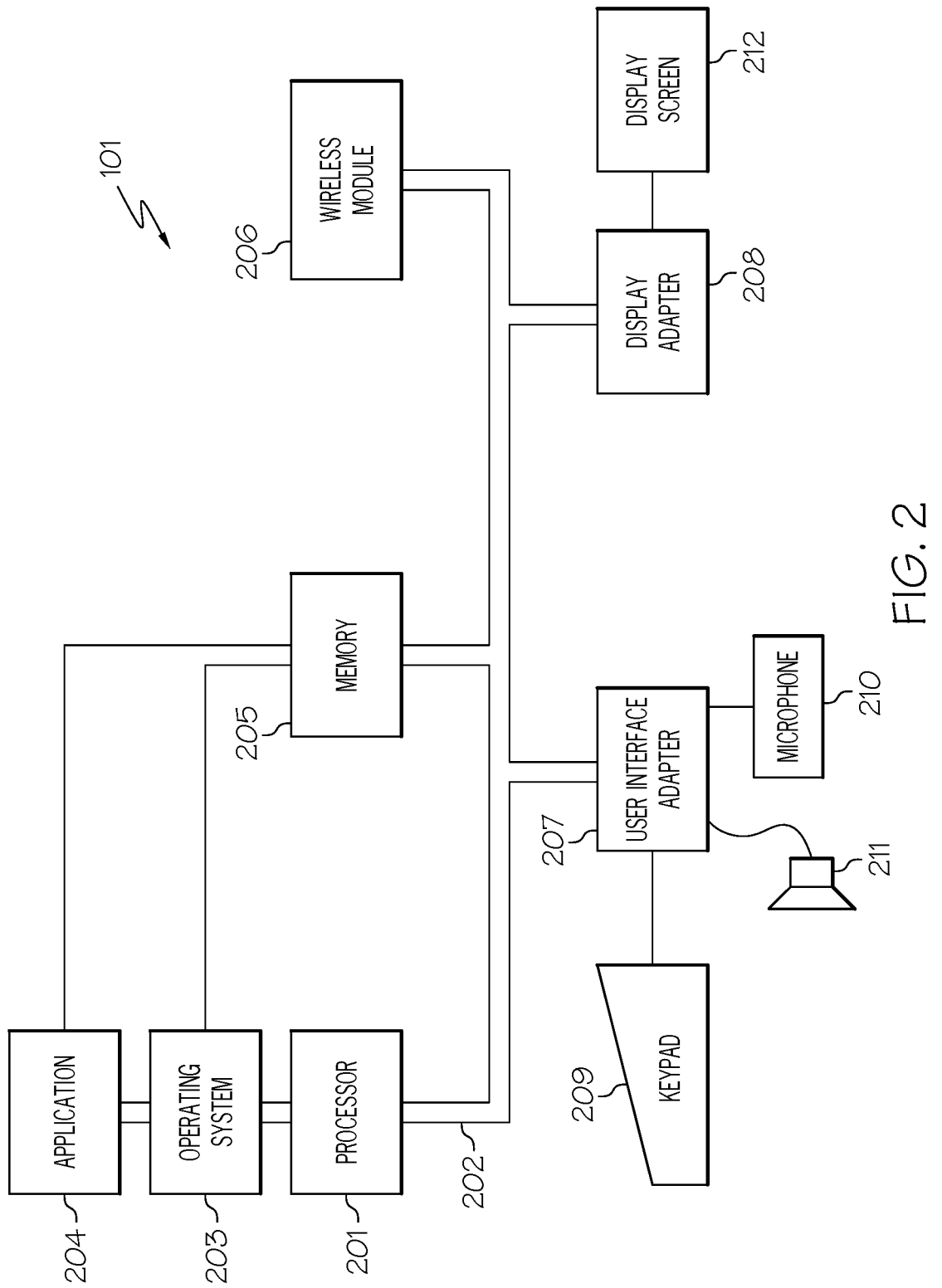
FIG. 2 illustrates a hardware configuration of a mobile device in accordance with an embodiment of the present invention.

Referring now to FIG. 2, FIG. 2 illustrates a hardware configuration of mobile device 101 (FIG. 1) which is representative of a hardware environment for practicing the present invention. Referring to FIG. 2, mobile device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a global positioning system application, a program for entering attributes about the user to populate a profile for the user as discussed further below in association with FIGS. 4-12.

Mobile device 101 further includes a memory 205 connected to bus 202 that is configured to control the other functions of mobile device 101. Memory 205 is generally integrated as part of the mobile device 101 circuitry, but may, in some embodiments, include a removable memory, such as a removable disk memory, integrated circuit (IC) memory, a memory card, or the like. Processor 201 and memory 205 also implement the logic and store the settings, preferences and parameters for mobile device 101. It should be noted that software components including operating system 203 and application 204 may be loaded into memory 205, which may be mobile device's 101 main memory for execution.

Mobile device 101 additionally includes a wireless module 206 that interconnects bus 202 with an outside network (e.g., network 102 of FIG. 1) thereby allowing mobile device 101 to communicate with other mobile devices 101, social network server 103 and social clustering server 104. In one embodiment, wireless module 206 includes local circuitry configured to wirelessly send and receive short range signals, such as Bluetooth, infrared or Wi-Fi. Furthermore, wireless module 206 may include circuitry to transmit a radio beacon.

I/O devices may also be connected to mobile device 101 via a user interface adapter 207 and a display adapter 208. Keypad 209, microphone 210 and speaker 211 may all be interconnected to bus 202 through user interface adapter 207. Keypad 209 is configured as part of mobile device 101 for dialing telephone numbers and entering data. Mobile device 101 may have microphone 210 and speaker 211 for the user to speak and listen to callers. Additionally, mobile device 101 includes a display screen 212 connected to system bus 202 by display adapter 208. Display screen 212 may be configured to display messages and information about incoming calls or other features of mobile device 101 that use a graphic display. In this manner, a user is capable of inputting to mobile device 101 through keypad 209 or microphone 210 and receiving output from mobile device 101 via speaker 211 or display screen 212. Other input mechanisms may be used to input data to mobile device 101 that are not shown in FIG. 2, such as display screen 212 having touch-screen capability with the ability to utilize a virtual keyword. Mobile device 101 of FIG. 2 is not to be limited in scope to the elements depicted in FIG. 2 and may include fewer or additional elements than depicted in FIG. 2.

Figure 3:
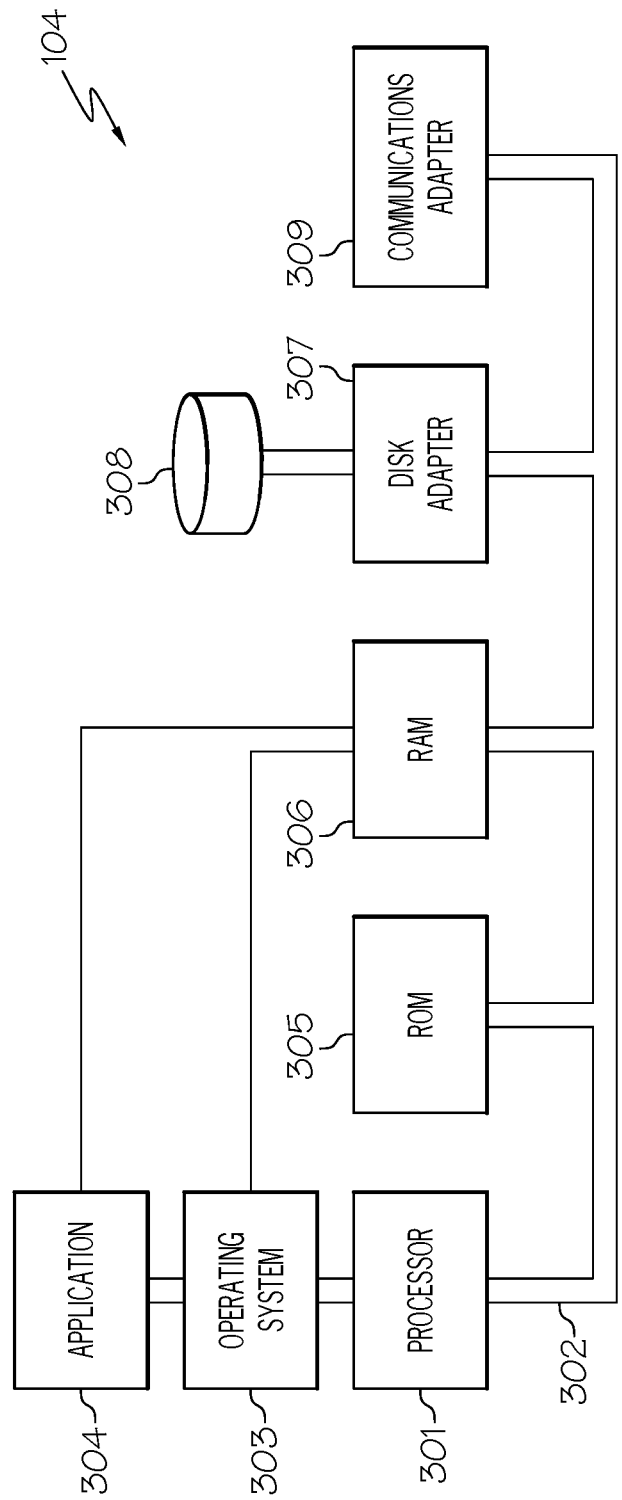
FIG. 3 illustrates a hardware configuration of a social clustering server in accordance with an embodiment of the present invention.

FIG. 3 illustrates a hardware configuration of social clustering server 104 (FIG. 1) which is representative of a hardware environment for practicing the present invention. Referring to FIG. 3, social clustering server 104 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for assisting users (e.g., users of mobile devices 101 of FIG. 1) to meet with other users with complementary profiles as discussed further below in association with FIGS. 4-12.

Referring again to FIG. 3, read-only memory ("ROM") 305 is coupled to system bus 302 and includes a basic input/output system ("BIOS") that controls certain basic functions of social clustering server 104. Random access memory ("RAM") 306 and disk adapter 307 are also coupled to system bus 302. It should be noted that software components including operating system 303 and application 304 may be loaded into RAM 306, which may be social clustering server's 104 main memory for execution. Disk adapter 307 may be an integrated drive electronics ("IDE") adapter that communicates with a disk unit 308, e.g., disk drive. It is noted that the program for assisting users (e.g., users of mobile devices 101 of FIG. 1) to meet with other users with complementary profiles, as discussed further below in association with FIGS. 4-12, may reside in disk unit 308 or in application 304.

Social clustering server 104 may further include a communications adapter 309 coupled to bus 302. Communications adapter 309 interconnects bus 302 with an outside network (e.g., network 102 of FIG. 1) thereby enabling social clustering server 104 to communicate with mobile devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently social networking sites only provide users the ability to interact with other users "virtually" as opposed to "physically." However, people are generally social and desire to interact with other people with common interests and experiences in the "physical world" as opposed to simply the "virtual world." If a user desires to meet another user in person, then the user may typically send a message to the other user requesting to meet at a designated place at a designated time. However, such a process is inefficient and requires the user to personally invite every individual the user may have an interest in meeting. Furthermore, there may be other individuals with complementary interests and experiences that the user does not know and it would be nice for the user to meet with those individuals. "Complementary" interests and experiences, as used herein, refer to interests and experiences that match or harmonize with each other. For example, it may be shown that people who like jazz music get along very well with dog lovers. As a result, such interests may be said to be complementary. Currently though social networking services do not assist the user in meeting such individuals with complementary interests and experiences in the physical world.

The principles of the present invention provide a means for assisting users to meet other users in the physical world with complementary profiles at a designated waypoint utilizing profile attributes (e.g., interests and experiences) of the users to form a cluster as discussed below in association with FIGS. 4-12. "Complementary profiles," as used herein, refer to profiles containing attributes that are deemed to be complementary. That is, complementary profiles contain attributes that match or harmonize with each other. The determination of profiles being complementary may be determined in many manners, such as being based on similar interests or experiences, a user joining a cluster (discussed further below), the user's application usage characteristics or historical locations of the user. A more detailed description regarding complementary profiles is described further below.

Figure 4:
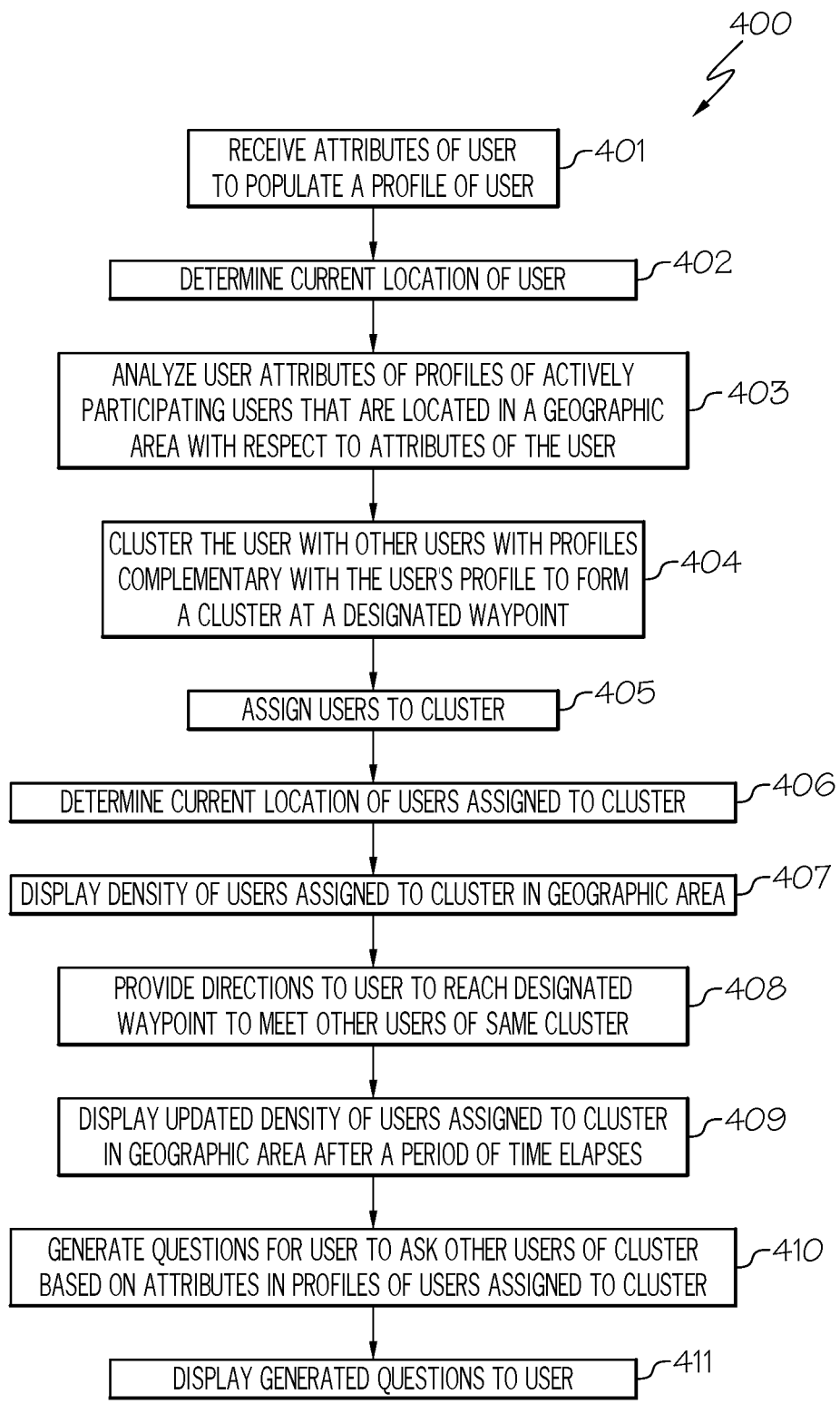
FIG. 4 is a flowchart of a method for assisting users to meet other users in the physical world with complementary profiles at a designated waypoint utilizing profile attributes of the users to form a cluster in accordance with an embodiment of the present invention.
Figure 5:
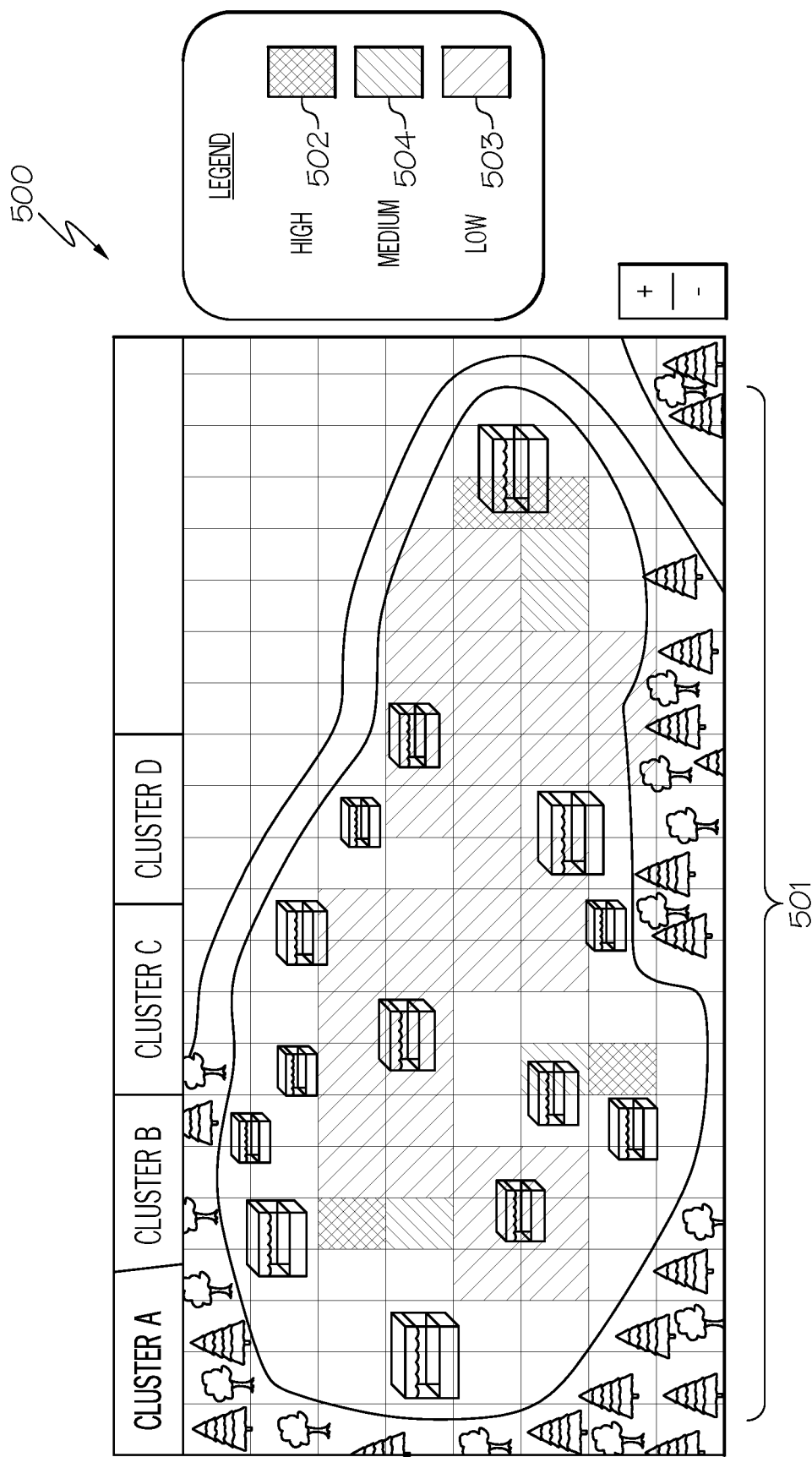
FIG. 5 is a screenshot of a density of users of a cluster in a geographic area displayed to the user in accordance with an embodiment of the present invention.
Figure 6:
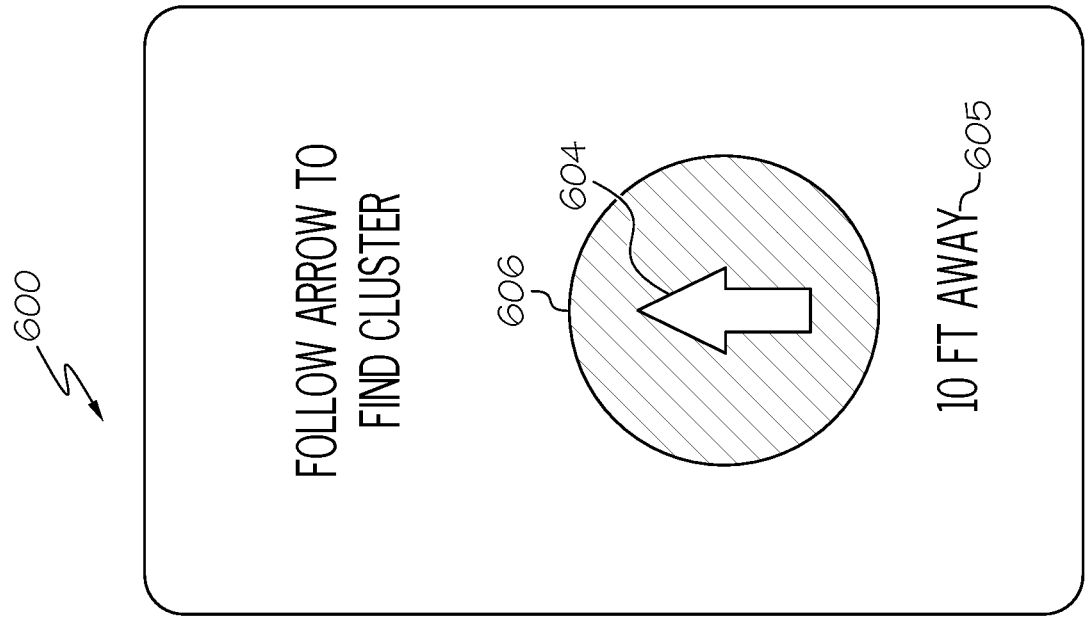
FIG. 6 is a screenshot of visually directing the user to meet the other users of the cluster at the designated waypoint in accordance with an embodiment of the present invention.
Figure 6:
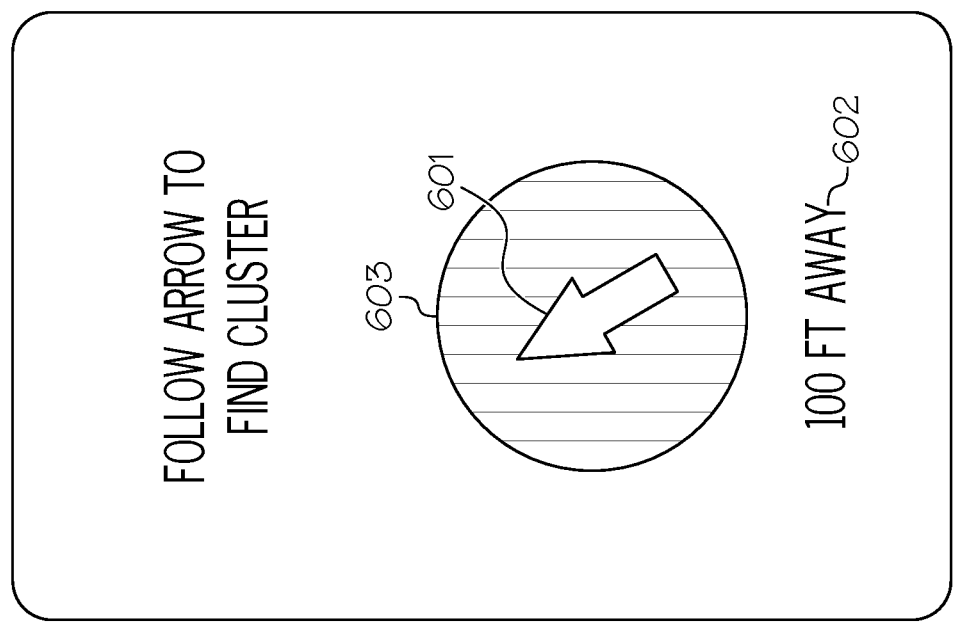
Figure 7:
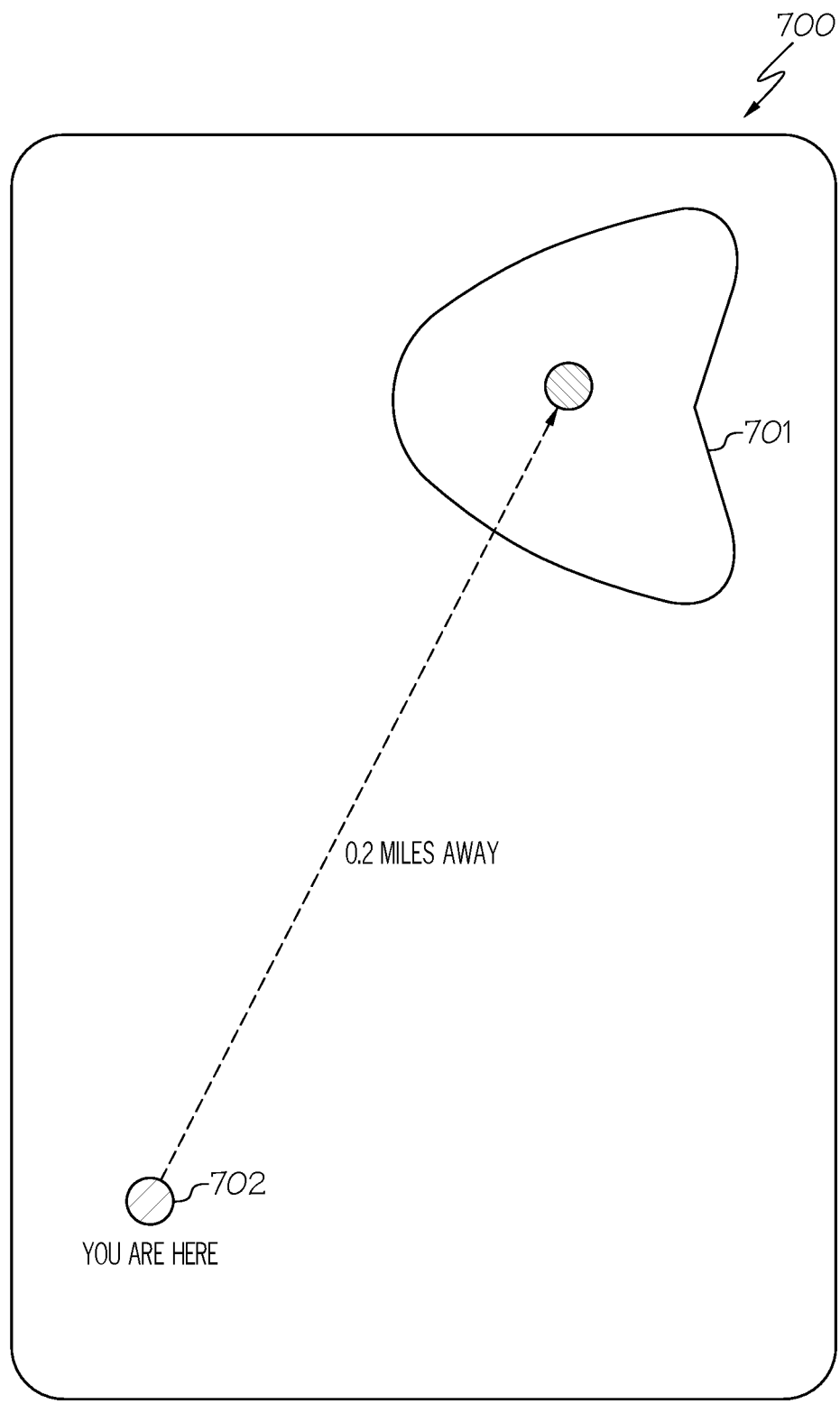
FIG. 7 is an alternative screenshot of visually directing the user to meet the other users of the cluster at the designated waypoint in accordance with an embodiment of the present invention.
Figure 8:
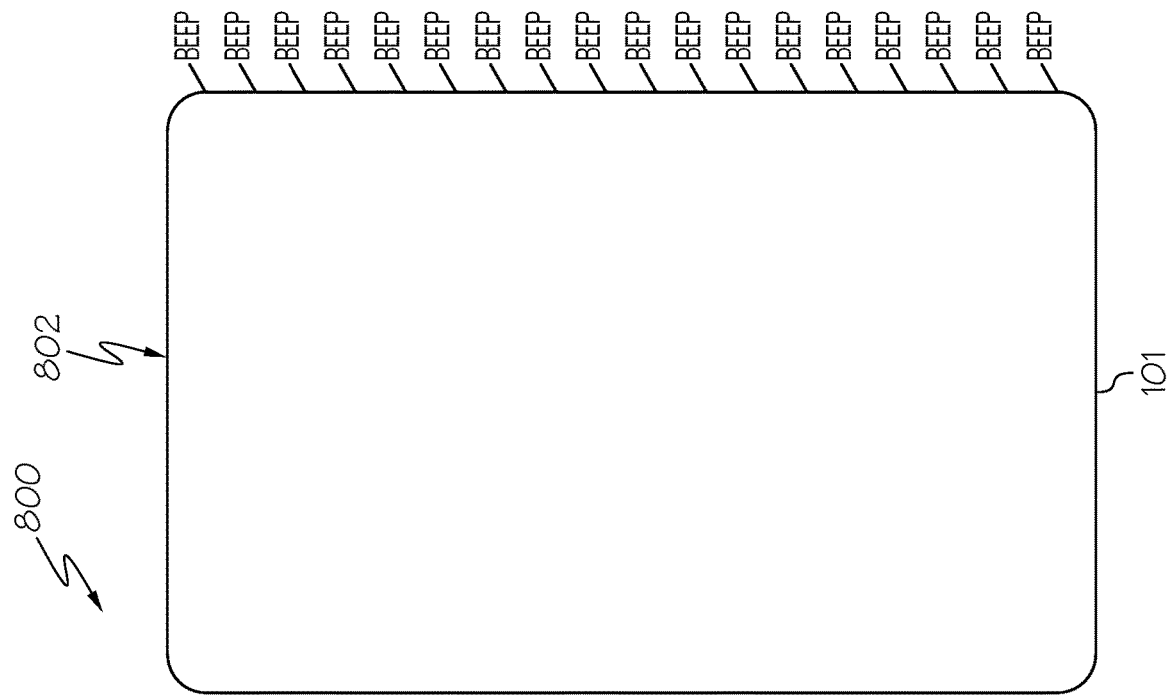
FIG. 8 is a screenshot of auditorily directing the user to meet the other users of the cluster at the designated waypoint in accordance with an embodiment of the present invention.
Figure 8:
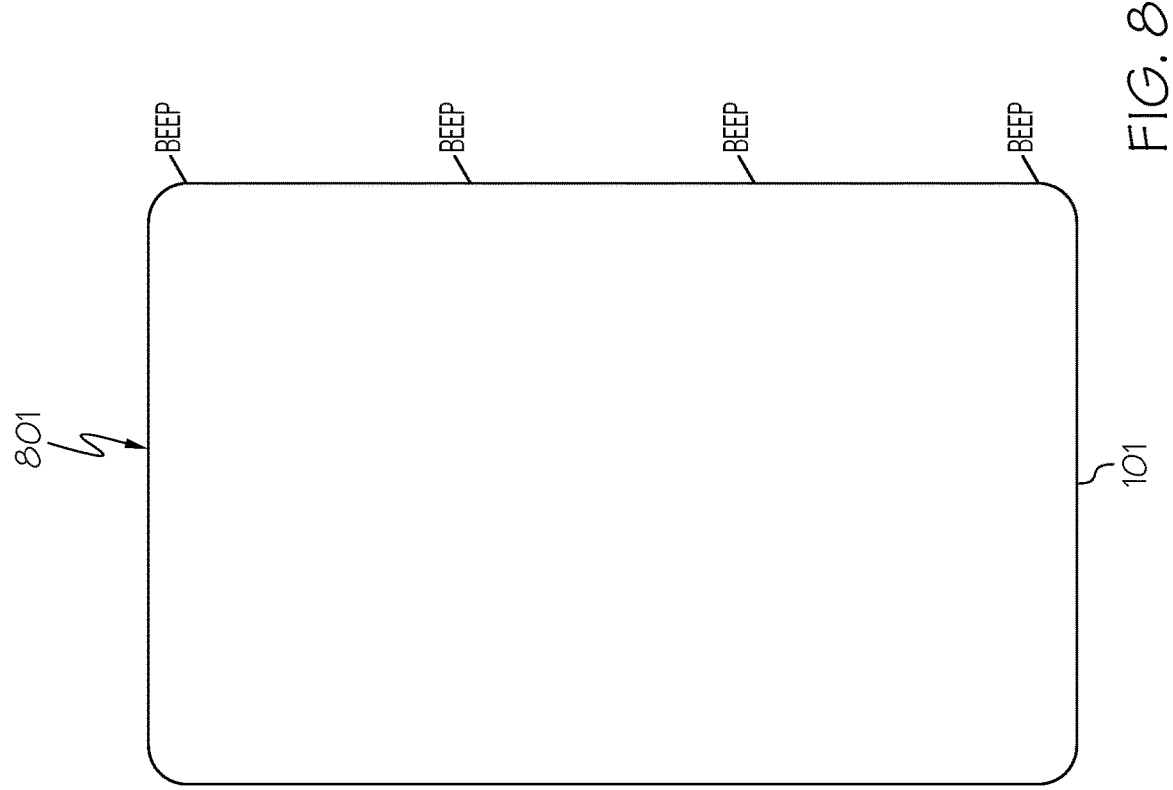
Figure 9:
FIG. 9 is a screenshot of tactilely directing the user to meet the other users of the cluster at the designated waypoint in accordance with an embodiment of the present invention.
Figure 9:
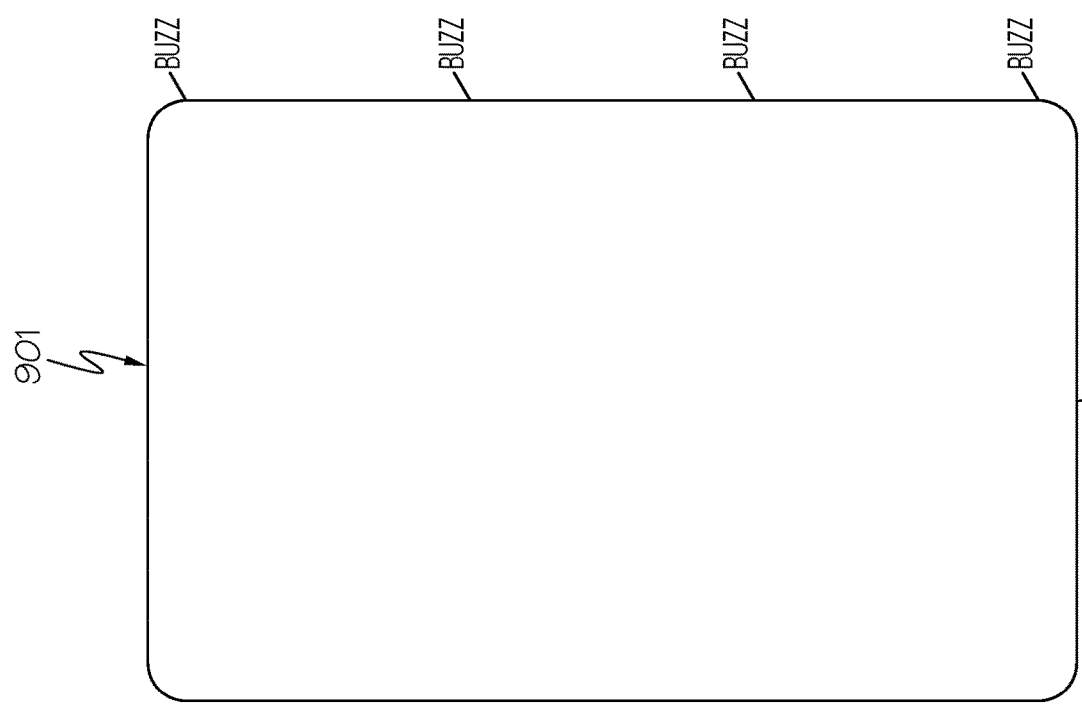
Figure 10:
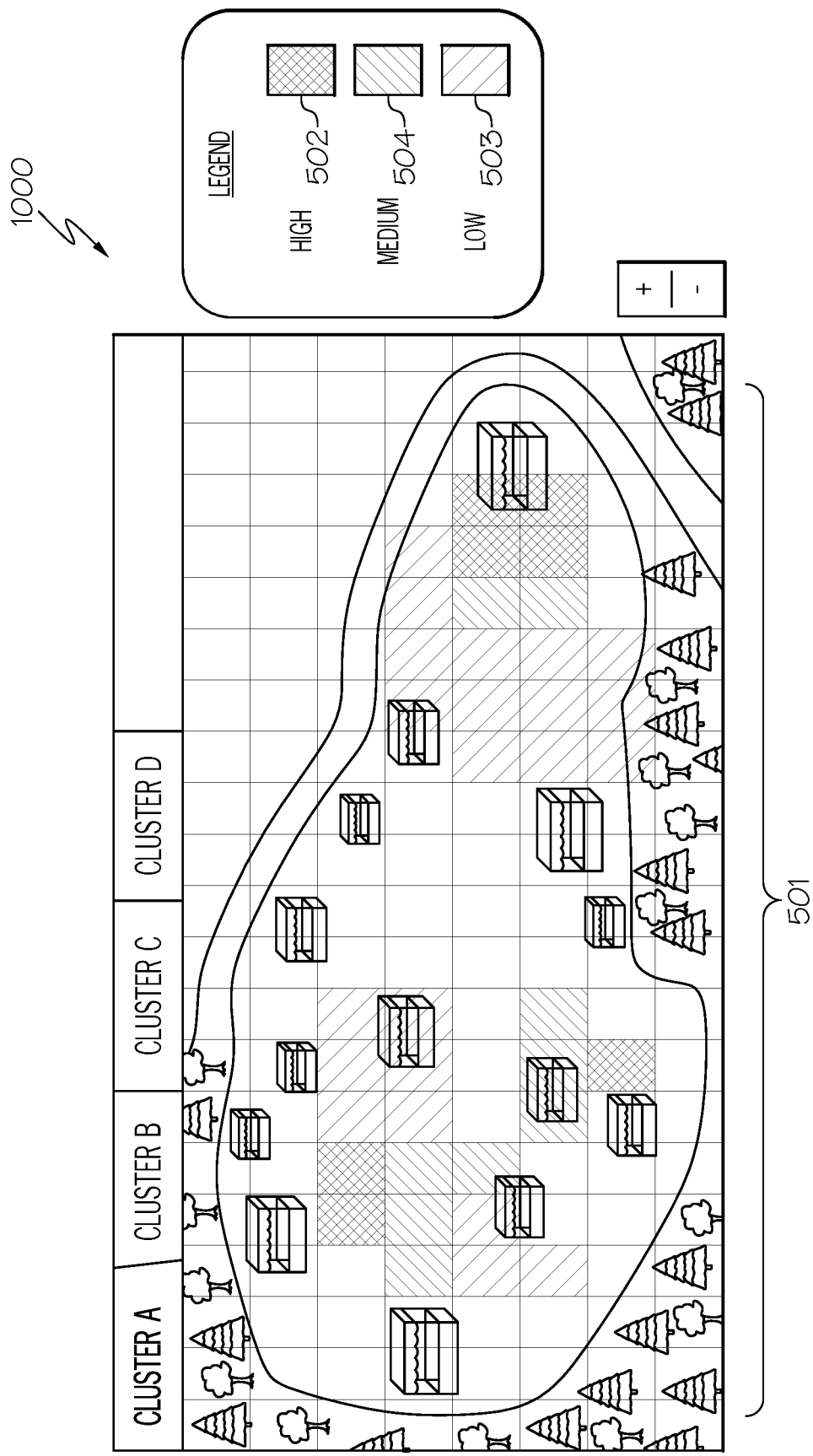
FIG. 10 is a screenshot of an updated density of users of a cluster in a geographic area displayed to the user after a period of time elapses in accordance with an embodiment of the present invention.
Figure 11:
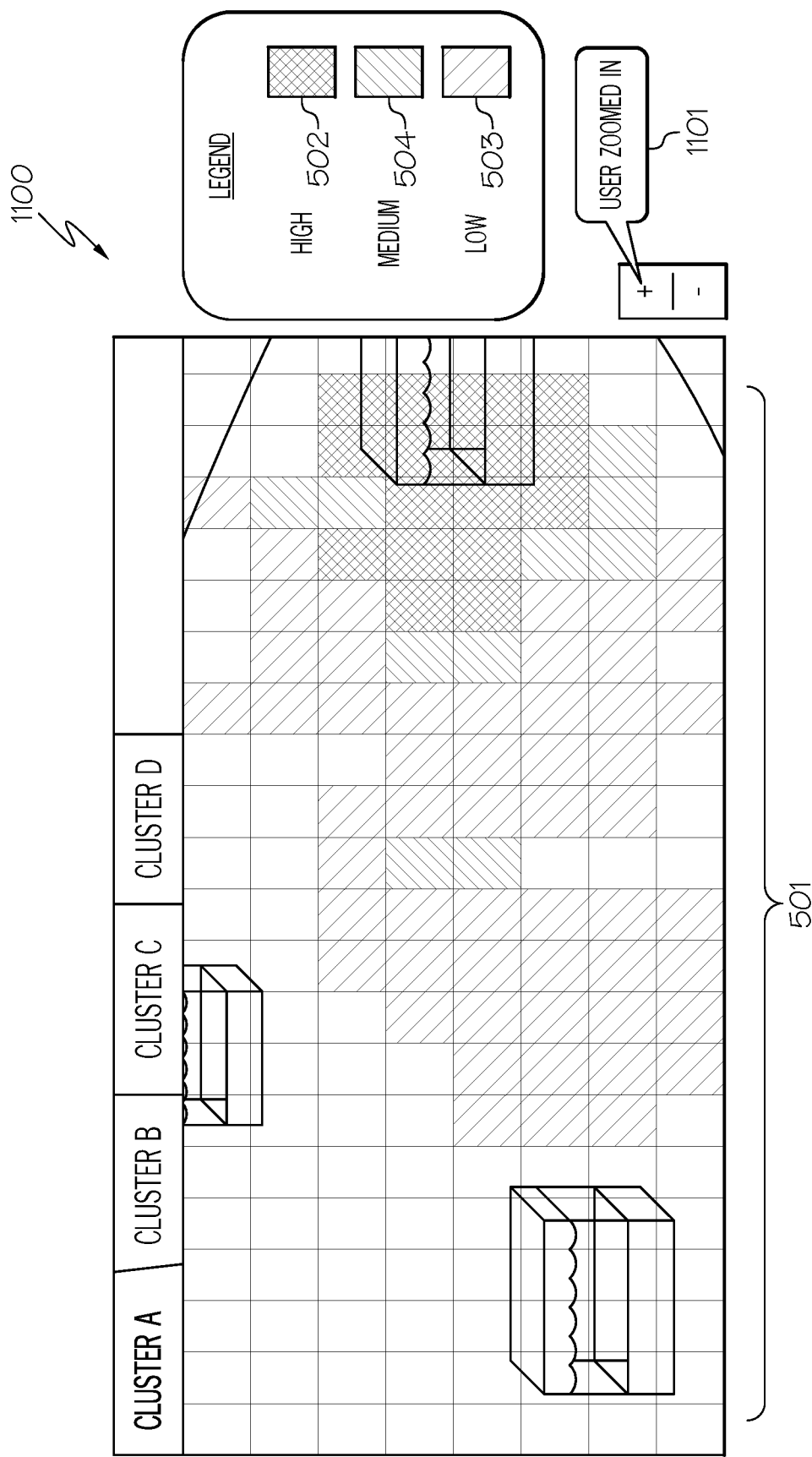
FIG. 11 is a zoomed-in version of the screenshot of FIG. 10 in accordance with an embodiment of the present invention.
Figure 12:
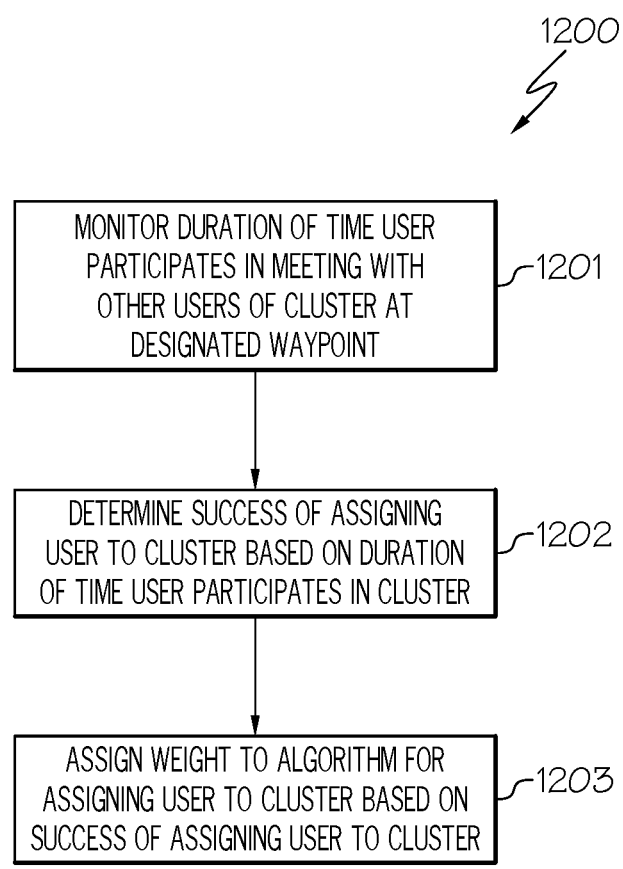
FIG. 12 is a flowchart of a method for determining a success in assigning a user to a cluster in accordance with an embodiment of the present invention.

FIG. 4 is a flowchart of a method for assisting users to meet other users in the physical world with complementary profiles at a designated waypoint utilizing profile attributes of the users to form a cluster. FIG. 5 is a screenshot of a density of users of a cluster in a geographic area displayed to the user. FIG. 6 is a screenshot of visually directing the user to meet the other users of the cluster at the designated waypoint. FIG. 7 is an alternative screenshot of visually directing the user to meet the other users of the cluster at the designated waypoint. FIG. 8 is a screenshot of auditorily directing the user to meet the other users of the cluster at the designated waypoint. FIG. 9 is a screenshot of tactilely directing the user to meet the other users of the cluster at the designated waypoint. FIG. 10 is a screenshot of an updated density of users of a cluster in a geographic area displayed to the user after a period of time elapses. FIG. 11 is a zoomed-in version of the screenshot of FIG. 10. FIG. 12 is a flowchart of a method for determining a success in assigning a user to a cluster.

As stated above, FIG. 4 is a flowchart of a method 400 for assisting users to meet other users in the physical world with complementary profiles at a designated waypoint utilizing profile attributes of the users to form a cluster in accordance with an embodiment of the present invention.

Referring to FIG. 4, in conjunction with FIGS. 1-3, in step 401, social clustering server 104 receives attributes of a user (i.e., user of mobile device 101) to populate a profile of the user. In one embodiment, the user enters such attributes via an application running on the user's mobile device 101. In one embodiment, such attributes may indicate the user's interests and experiences. For example, the attributes may include the user's likes, dislikes, birthplace, marital status, residence, age, profession, associations (e.g., friends, organizations), schooling, past location data, etc. In one embodiment, such attributes that form a profile are stored in database 105. In one embodiment, the users' attributes may be added or removed thereby changing the profile of such users.

In step 402, social clustering server 104 determines the current location of the user. In one embodiment, social clustering server 104 determines the current location of the user by mobile device 101 transmitting its current location obtained from a global positioning system application running on mobile device 101. In another embodiment, social clustering server 104 determines the current location of the user by receiving a radio beacon from mobile device 101 which broadcasts a radio signal which is picked up by social clustering server 104. Such a radio signal may be analyzed by social clustering server 104 to determine its signal strength and/or transmission power which can be used to determine an approximate location of mobile device 101. In one embodiment, the current location of the user is updated in real time.

In step 403, social clustering server 104 analyzes the user attributes of profiles of actively participating users that are located in a geographic area where the user is located with respect to the attributes of the user (e.g., user of mobile device 101A). As discussed above, social clustering server 104 may determine the current location of the user providing the attributes to populate the user's profile. Social clustering server 104 may also determine the location of other users (e.g., other users of mobile devices 101) in a similar fashion. In this manner, social clustering server 104 may determine the location of users that are actively participating in this system, such as those that have populated a profile with attributes about the user's interests and experiences. In one embodiment, users may be deemed to be actively participating based on those users selecting an option on their mobile device 101 to participate, such as joining a "cluster" as discussed further below.

In one embodiment, social clustering server 104 utilizes natural language processing to analyze the attributes of profiles of actively participating users that are located in a geographic area where the user is located with respect to the attributes of the user in order to identify other users that have profiles complementary with the user's profile. For example, social clustering server 104 may utilize natural language processing to focus on keywords in the user's profile, such as "Batman® fan," "hiker," and "Java® developer," which may indicate an interest or experience of the user. Social clustering server 104 may then utilize natural language processing to identify words in the other users' profiles that are the same or similar to those found in the user's profile thereby identifying other users that have complementary profiles.

Profiles may be determined to be complementary in many manners, including, but not limited to, similar interests or experiences, a user joining a cluster (discussed further below), the user's application usage characteristics, historical locations of the user, etc. The principles of the present invention are not to be limited in scope to the examples discussed above but are to include any means for determining whether a user's attributes match or harmonize with other users' attributes.

In step 404, social clustering server 104 clusters the user with the other users with profiles complementary with the user's profile to form a "cluster" at a designated waypoint. A "cluster," as used herein, refers to a group of users (i.e., users of mobile devices 101) that are determined to have complementary profiles and are directed to all meet at a designated waypoint. As discussed above, social clustering server 104 may identify other users with complementary profiles as the user by analyzing the user attributes of profiles of actively participating users that are located in a geographic area with respect to the attributes of the user. A "designated waypoint," as used herein, refers to a designated location within the geographic area discussed above in connection with step 403. For example, the geographic area of step 403 may encompass a large park and the designated waypoint may refer to the fountain located at the center of the park. While the following discusses a single waypoint, the complementary profiles may be associated with multiple waypoints. In other words, there may be multiple clusters forming a "group" with a shared interest, where each cluster may be associated with a unique designated waypoint. These clusters may converge into a single cluster thereby having the multiple waypoints converge to a single waypoint.

In one embodiment, users may be added and removed from the pool of "active users" in real time thereby changing the composition of the cluster, such as in real time.

In step 405, social clustering server 104 assigns the users (the user who provided the attributes in step 401 as well as the other users with complementary profiles as the user) to the cluster.

In step 406, social clustering server 104 determines the current location of the users assigned to the cluster. Social clustering server 104 determines the current location of the users assigned to the cluster using the means as discussed above in connection with step 402. In one embodiment, social clustering server 104 periodically (e.g., every 1 minute) determines the current location of the users assigned to the cluster.

In step 407, social clustering server 104, optionally, displays the density of users assigned to the cluster in the geographic area (geographic area discussed in connection with step 403) as illustrated in FIG. 5.

FIG. 5 is a screenshot 500 of a density of users of a cluster in a geographic area 501 displayed to the user, such as via display screen 212 of FIG. 2, in accordance with an embodiment of the present invention. Referring to FIG. 5, the density of users (number of users in a particular location) may be indicated based on different cross hatching, where cross hatching 502 represents the highest density of users, cross hatching 503 represents the lowest density of users and cross hatching 504 represents a density of users that is in between the highest and lowest density.

Returning to FIG. 4, in conjunction with FIGS. 1-3 and 5, in step 408, social clustering server 104 provides directions to the user (e.g., user of mobile device 101A) to reach the designated waypoint to meet the other users of the same cluster as illustrated in FIGS. 6-9. In this manner, the user is able to meet other users in the physical world with complementary profiles at a designated waypoint.

FIG. 6 is a screenshot 600 of visually directing the user to meet the other users of the cluster at the designated waypoint in accordance with an embodiment of the present invention. Referring to FIG. 6, screenshot 600 illustrates two examples of visually directing the user, such as via display screen 212 of FIG. 2, to meet the other users of the cluster at the designated waypoint. In the first example, a directional arrow 601 points to the left indicating that the user needs to veer to the left. Furthermore, the user is provided an approximation of how far away the user is located from the cluster. In the first example, the user is informed that the user is 100 feet away (see element 602) from joining the cluster. In one embodiment, the background 603 of arrow 601 may be color coded to indicate how far away the user is from joining the cluster. For example, background 603 may have the color of blue to indicate that the user is very far away from the cluster.

In the second example, a directional arrow 604 points to the center indicating that the user needs to continue straight.

Furthermore, the user is provided an approximation of how far away the user is located from the cluster. In the second example, the user is informed that the user is 10 feet away (see element 605) from joining the cluster. In one embodiment, the background 606 of arrow 604 may be color coded to indicate how far away the user is from joining the cluster. For example, background 606 may have the color of red to indicate that the user is very close to the cluster.

FIG. 7 is an alternative screenshot 700 of visually directing the user, such as via display screen 212 of FIG. 2, to meet the other users of the cluster at the designated waypoint in accordance with an embodiment of the present invention.

Referring to FIG. 7, screenshot 700 indicates an approximate distance (e.g., 0.2 miles away) that the user is located from the location of the cluster 701 with respect to the present location 702 of the user.

FIG. 8 is a screenshot 800 of auditorily directing the user to meet the other users of the cluster at the designated waypoint in accordance with an embodiment of the present invention. Referring to FIG. 8, screenshot 800 illustrates that the slower the beeps (illustrated in element 801) emanating from mobile device 101, such as via speaker 211, the further away the user is located from reaching the designated waypoint. On the other hand, the faster the beeps (illustrated in element 802) emanating from mobile device 101, the closer the user is located to reaching the designated waypoint.

FIG. 9 is a screenshot 900 of tactilely directing the user to meet the other users of the cluster at the designated waypoint in accordance with an embodiment of the present invention. Referring to FIG. 9, screenshot 900 illustrates that the slower the buzzes (illustrated in element 901) emanating from mobile device 101 the further away the user is located from reaching the designated waypoint. On the other hand, the faster the buzzes (illustrated in element 902) emanating from mobile device 101, the closer the user is located to reaching the designated waypoint.

Returning to FIG. 4, in conjunction with FIGS. 1-3 and 5-9, in step 409, social clustering server 104 optionally displays the updated density of users assigned to the cluster in the geographic area (geographic area discussed in connection with step 403) after a period of time elapses as illustrated in FIG. 10. In this manner, the user can visually see how many additional users have reached the designated waypoint. In one embodiment, this update may be in response to a query provided by the user (e.g., user of mobile device 101A) and may be generated by social clustering server 104 at any time in response to such a query.

FIG. 10 is an updated screenshot 1000 of the screenshot 500 of FIG. 5 that is displayed to the user, such as via display screen 212 of FIG. 2, after a period of time elapses in accordance with an embodiment of the present invention.

In one embodiment, the user may have the ability to zoom into a particular region of the geographic area 501 displayed on the user's display screen 212 as illustrated in FIG. 11.

FIG. 11 is a screenshot 1100 of a zoomed-in version of screenshot 1000 of FIG. 10. Referring to FIG. 11, screenshot 1100 illustrates that the user (e.g., user of mobile device 101A) has the option 1101 of zooming into a particular region of geographic area 501.

Returning to FIG. 4, in conjunction with FIGS. 1-3 and 5-11, in step 410, social clustering server 104 generates the questions for the user to ask other users of the cluster based on the attributes in the profiles of the users assigned to the cluster. In one embodiment, social clustering server 104 may generate questions, such as "Where are you from?", "Who do you know?" and "What are your favorite bands?", based on the fact that the users in the cluster are all from the same state, have a mutual friend and all enjoy country music. Such questions may be generated to make the user more at ease in meeting the other users at the cluster, especially since the user does not know any personal information about the other users in the cluster. In this manner, the user is able to discover similar interests and experiences between himself/ herself and the other users of the cluster.

In one embodiment, such questions may be generated using natural language processing. For example, social clustering server 104 may identify common interests and experiences based on identifying the same or similar words in the users' profiles using natural language processing. Social clustering server 104 may then generate questions to inquire about these common interests and experiences using natural language processing.

In step 411, social clustering server 104 displays the generated questions to the user, such as via display screen 212.

After assigning the user (e.g., user of mobile device 101A) to a cluster, social clustering server 104 may monitor the length of time the user spends in the cluster to determine how successful social clustering server 104 was in assigning the user to such a cluster as discussed below in connection with FIG. 12.

FIG. 12 is a flowchart of a method 1200 for determining a success in assigning a user to a cluster in accordance with an embodiment of the present invention.

Referring to FIG. 12, in conjunction with FIGS. 1-3, in step 1201, social clustering server 104 monitors the duration of time the user (e.g., user of mobile device 101A) participates in the cluster. That is, social clustering server 104 monitors the duration of time the user participates in meeting with the other users of the cluster at the designated waypoint. Other measurements could also be used to measure the success of a cluster, including, but not limited to the following: a user's use of their cell phone (a negative indicator) or using a mobile device's microphone to measure how much the user is conversing (a positive indicator).

In step 1202, social clustering server 104 determines the success of assigning the user to the cluster based on the duration of time the user participates in the cluster. If the user spends a significant amount of time in the cluster, then it may be inferred that social clustering server 104 achieved great success in assigning the user to this particular cluster. If, however, the user does not spend much time in the cluster, then it may be inferred that social clustering server 104 did not achieve much success in assigning the user to this particular cluster.

In step 1203, social clustering server 104 assigns a weight to the algorithm for assigning the user to the cluster based on the success (or lack thereof) of assigning the user to the cluster. In one embodiment, the greater the success, the greater the weight assigned to the algorithm for assigning the user to the cluster. However, a lack of success in assigning the user to the cluster may result in assigning a lower weight to the algorithm for assigning the user to the cluster. In this manner, a more appropriate algorithm may be utilized for assigning the user to a cluster.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for assisting a user to meet with other users with complementary attributes, the method comprising:
   receiving attributes of a user to populate a profile of said user;
   analyzing user attributes of profiles of actively participating users that are located in a geographic area with respect to said attributes of said user to determine other users with profiles complementary with said user's profile;
   clustering said user and said other users with profiles complementary with said user's profile to form a cluster at a designated waypoint;
   assigning said user and said other users to said cluster;
   monitoring a duration of time said user participates in meeting with said other users of said cluster at said designated waypoint;
   determining a success of assigning said user to said cluster based on said duration of time said user participates in meeting with said other users of said cluster at said designated waypoint; and
   assigning a weight to an algorithm for assigning said user to said cluster based on said success of assigning said user to said cluster.

2. The method as recited in claim 1 further comprising:
   determining a current location of said other users and said user assigned to said cluster; and
   displaying a density of users assigned to said cluster in said geographic area.

3. The method as recited in claim 2 further comprising:
   displaying an updated density of users assigned to said cluster in said geographic area after a period of time elapses.

4. The method as recited in claim 1 further comprising:
   providing directions to said user to reach said designated waypoint to meet with said other users of said cluster.

5. The method as recited in claim 4, wherein said directions are provided to said user visually, auditorily or tactilely.

6. The method as recited in claim 1, wherein multiple clusters form a group with multiple waypoints, wherein each of said multiple clusters is associated with a unique waypoint.

7. The method as recited in claim 6, wherein said multiple clusters converge into a single cluster thereby having said multiple waypoints converge to a single waypoint.

8. A computer program product for assisting a user to meet with other users with complementary attributes, the computer program product comprising a computer readable storage medium having program code embodied therewith, the program code comprising the programming instructions for:
   receiving attributes of a user to populate a profile of said user;
   analyzing user attributes of profiles of actively participating users that are located in a geographic area with respect to said attributes of said user to determine other users with profiles complementary with said user's profile;
   clustering said user and said other users with profiles complementary with said user's profile to form a cluster at a designated waypoint;
   assigning said user and said other users to said cluster;
   monitoring a duration of time said user participates in meeting with said other users of said cluster at said designated waypoint;
   determining a success of assigning said user to said cluster based on said duration of time said user participates in meeting with said other users of said cluster at said designated waypoint; and
   assigning a weight to an algorithm for assigning said user to said cluster based on said success of assigning said user to said cluster.

9. The computer program product as recited in claim 8, wherein the program code further comprises the programming instructions for:
   determining a current location of said other users and said user assigned to said cluster; and
   displaying a density of users assigned to said cluster in said geographic area.

10. The computer program product as recited in claim 9, wherein the program code further comprises the programming instructions for:
    displaying an updated density of users assigned to said cluster in said geographic area after a period of time elapses.

11. The computer program product as recited in claim 8, wherein the program code further comprises the programming instructions for:
    providing directions to said user to reach said designated waypoint to meet with said other users of said cluster.

12. The computer program product as recited in claim 11, wherein said directions are provided to said user visually, auditorily or tactilely.

13. The computer program product as recited in claim 8, wherein multiple clusters form a group with multiple waypoints, wherein each of said multiple clusters is associated with a unique waypoint.

14. The computer program product as recited in claim 13, wherein said multiple clusters converge into a single cluster thereby having said multiple waypoints converge to a single waypoint.

15. A system, comprising:
    a memory for storing a computer program for assisting a user to meet with other users with complementary attributes; and
    a processor connected to said memory, wherein said processor is configured to execute the program instructions of the computer program comprising:
       receiving attributes of a user to populate a profile of said user;
       analyzing user attributes of profiles of actively participating users that are located in a geographic area with respect to said attributes of said user to determine other users with profiles complementary with said user's profile;
       clustering said user and said other users with profiles complementary with said user's profile to form a cluster at a designated waypoint;
       assigning said user and said other users to said cluster;
       monitoring a duration of time said user participates in meeting with said other users of said cluster at said designated waypoint;
       determining a success of assigning said user to said cluster based on said duration of time said user participates in meeting with said other users of said cluster at said designated waypoint; and
       assigning a weight to an algorithm for assigning said user to said cluster based on said success of assigning said user to said cluster.

16. The system as recited in claim 15, wherein the program instructions of the computer program further comprise:
- determining a current location of said other users and said user assigned to said cluster; and
- displaying a density of users assigned to said cluster in said geographic area.

17. The system as recited in claim 16, wherein the program instructions of the computer program further comprise:
- displaying an updated density of users assigned to said cluster in said geographic area after a period of time elapses.

18. The system as recited in claim 15, wherein the program instructions of the computer program further comprise:
- providing directions to said user to reach said designated waypoint to meet with said other users of said cluster.

19. The system as recited in claim 15, wherein multiple clusters form a group with multiple waypoints, wherein each of said multiple clusters is associated with a unique waypoint.

20. The system as recited in claim 19, wherein said multiple clusters converge into a single cluster thereby having said multiple waypoints converge to a single waypoint.

* * * * *